United States Patent
Morilhat et al.

(10) Patent No.: US 11,247,594 B2
(45) Date of Patent: Feb. 15, 2022

(54) HEADREST ELEMENT AND HEADREST

(71) Applicant: ADIENT ENGINEERING AND IP GMBH, Burscheid (DE)

(72) Inventors: Philippe Morilhat, Kertzfeld (FR); Christophe Fritsch, Souffelweyersheim (FR); Christophe Moriniere, Holtzheim (FR)

(73) Assignee: Adient Engineering and IP GMBH, Burscheid (DE)

( * ) Notice: Subject to any disclaimer, the term of this patent is extended or adjusted under 35 U.S.C. 154(b) by 0 days.

(21) Appl. No.: 16/973,837

(22) PCT Filed: Jun. 6, 2019

(86) PCT No.: PCT/EP2019/064785
§ 371 (c)(1),
(2) Date: Dec. 10, 2020

(87) PCT Pub. No.: WO2019/238524
PCT Pub. Date: Dec. 19, 2019

(65) Prior Publication Data
US 2021/0122276 A1 Apr. 29, 2021

(30) Foreign Application Priority Data

Jun. 11, 2018 (DE) .................... 10 2018 209 295.8
Oct. 16, 2018 (DE) .................... 10 2018 217 706.6

(51) Int. Cl.
*A47C 7/38* (2006.01)
*A47C 7/36* (2006.01)
(Continued)

(52) U.S. Cl.
CPC ............. *B60N 2/885* (2018.02); *B60N 2/847* (2018.02); *A47C 7/38* (2013.01); *B60N 2/809* (2018.02); *B60N 2002/899* (2018.02)

(58) Field of Classification Search
CPC .......... B60N 2/68; B60N 2/809; B60N 2/838; B60N 2/885
See application file for complete search history.

(56) References Cited

U.S. PATENT DOCUMENTS 6,250,716 B1 * 6/2001 Clough .................. A47C 7/383
297/408
6,467,846 B2 * 10/2002 Clough .................. B60N 2/885
297/410

(Continued)

FOREIGN PATENT DOCUMENTS

CN 105438032 A 3/2016
DE 102012025191 B3 1/2014
(Continued)

OTHER PUBLICATIONS

European Patent Office, International Search Report with Written Opinion, dated Sep. 3, 2019, 13 pages, European Patent Office, Rijswijk, Netherlands.

*Primary Examiner* — Shin H Kim
(74) *Attorney, Agent, or Firm* — Marshall & Melhorn, LLC

(57) ABSTRACT

A headrest element may have a central supporting region and two lateral supporting regions. The lateral supporting regions may be pivotable with respect to the central supporting region about a side pivot axis, which may run at least substantially parallel to a supporting surface of the central supporting region, in such a manner that an angle of the supporting surfaces of the lateral supporting regions can in each case be adjusted variably with respect to the supporting surface of the central supporting region. The central supporting region and the lateral supporting regions may be jointly pivotable about a transverse pivot axis, which runs at least substantially perpendicular to the side pivot axes, in such a manner that an adjustment of the supporting regions (Continued)

in the longitudinal direction of the vehicle is possible. A headrest using the headrest element is also described.

8 Claims, 2 Drawing Sheets

(51) Int. Cl.
*B60N 2/885* (2018.01)
*B60N 2/847* (2018.01)
*B60N 2/809* (2018.01)
*B60N 2/80* (2018.01)

(56) References Cited

U.S. PATENT DOCUMENTS

| | | | |
|---|---|---|---|
| 7,040,705 B2* | 5/2006 | Clough | B60N 2/885 297/410 |
| 7,364,239 B2* | 4/2008 | Clough | A47C 7/38 297/391 |
| 7,871,129 B2* | 1/2011 | Boes | B60N 2/865 297/404 |
| 8,657,378 B2* | 2/2014 | Kunert | B60N 2/865 297/391 |
| 9,340,132 B2 | 5/2016 | Schmitz et al. | |
| 9,393,892 B1* | 7/2016 | Millan | B60N 2/824 |
| 10,144,515 B2* | 12/2018 | Le | B60N 2/42709 |
| 10,414,312 B2 | 9/2019 | Fredriksson | |
| 2004/0195893 A1* | 10/2004 | Clough | A47C 7/38 297/391 |
| 2004/0217639 A1* | 11/2004 | Clough | A47C 7/38 297/391 |
| 2017/0313217 A1* | 11/2017 | Line | B60N 2/865 |
| 2017/0313220 A1* | 11/2017 | Line | B60N 2/6009 |
| 2018/0050803 A1* | 2/2018 | Le | B64D 11/0605 |
| 2019/0061586 A1* | 2/2019 | Nakamura | B60N 2/885 |

FOREIGN PATENT DOCUMENTS

| | | |
|---|---|---|
| DE | 102013010705 A1 | 10/2014 |
| DE | 202018102807 U1 | 5/2018 |
| WO | WO/2011154130 A2 | 12/2011 |

* cited by examiner

HEADREST ELEMENT AND HEADREST

The invention relates to a headrest element for a headrest for a vehicle.

The invention furthermore relates to a headrest for a vehicle.

It is generally known from the prior art that vehicle seats have headrests for the restraint and for resting of a head of a vehicle occupant. It is known that a headrest body can be adjusted in the longitudinal, transverse and/or vertical direction of the vehicle.

Furthermore, headrests are known in general which have a central supporting region and two lateral supporting regions, wherein an angle of supporting surfaces of the lateral supporting regions can be adjusted with respect to a supporting surface of the central supporting region.

DE 10 2012 025 191 B3 discloses a headrest for a vehicle seat, the headrest having a base element fastened displaceably on a holding bracket. The base element has an electric motor which is provided for driving a vertical spindle to rotate via a drive shaft, wherein a thread of the vertical spindle engages in a thread of a receiving opening of a fastening element fastened to the holding bracket. The headrest furthermore has a sliding element which is guided in a longitudinally displaceable manner in a sliding opening of the base element, wherein the sliding element has a further electric motor which is provided for driving a horizontal spindle to rotate via a further drive shaft. A thread of the horizontal spindle engages here in a thread of a further receiving opening of a receiving means fastened to the base element.

Furthermore, DE 10 2013 010 705 A1 discloses a headrest which has a first component and a second component which are movable relative to each other in order to adjust the first component in its comfort position and to transfer same into a safety position. The first component here can take up a multiplicity of comfort positions. A Bowden cable is provided between the first and the second component, the Bowden cable moving the first component from each comfort position into the safety position, wherein a sheath of the Bowden cable is provided on the second component and a core of the Bowden cable is provided on the first component, or vice versa.

SUMMARY OF THE INVENTION

It is an object of the present invention to specify a headrest element for a headrest for a vehicle, the headrest element being improved in relation to the prior art, and an improved headrest.

In respect of the headrest element, the object is achieved according to the invention by the features specified in claim 1, and, in respect of the headrest, by the features specified in claim 9.

Advantageous refinements of the invention are the subject matter of the dependent claims.

The headrest element according to the invention has a central supporting region and two lateral supporting regions, also referred to as wings. The lateral supporting regions are pivotable with respect to the central supporting region about a side pivot axis, which runs at least substantially parallel to a supporting surface of the central supporting region, in such a manner that an angle of the supporting surfaces of the lateral supporting regions can in each case be adjusted variably with respect to the supporting surface of the central supporting region. In addition, the central supporting region and the lateral supporting regions are jointly pivotable about a transverse pivot axis, which runs at least substantially perpendicular to the side pivot axes, in such a manner that an adjustment of the supporting regions in the longitudinal direction of the vehicle is possible.

Owing to this refinement of the headrest element, diverse resting and supporting positions for a head of a vehicle occupant can be realized, and therefore it is possible to realize a particularly high degree of comfort with a simultaneously high degree of safety.

In one possible refinement of the headrest element, a holding element is provided which has a central fastening region for the fastening of a central supporting cushion forming the central supporting region, and two lateral fastening regions for the fastening in each case of a lateral supporting cushion forming the lateral supporting region. The holding element permits simple and secure fastening of the supporting cushions.

In a further possible refinement of the headrest element, the lateral fastening regions are each mounted at the central fastening region so as to be pivotable about the side pivot axis. By this means, an angle of the supporting surfaces of the lateral supporting cushions with respect to the supporting surface of the central supporting cushion can be variably adjusted.

In one possible development of the headrest element, the latter comprises a basic body, the position of which can be adjusted in the longitudinal, transverse and/or vertical direction. Optimum adaptation of a headrest position to a vehicle occupant is thereby made possible.

According to one possible refinement of the headrest element, the basic body has a fastening recess which is designed for receiving and for fastening an inclination adjustment hook, as a result of which a reliable adjustment of the inclination is ensured.

According to a further possible refinement of the headrest element, the basic body and the inclination adjustment hook form a unit which is covered with a covering.

For example, the holding element comprises a bearing element which projects through an upper recess of the covering and engages in a corresponding bearing element of the basic body, wherein the two bearing elements form a pivot bearing by means of which the holding element is pivotable about the transverse pivot axis. An inclination of the holding element can therefore be adjusted.

In one possible development of the headrest element, it is provided that a latching element is arranged at a lower end of the holding element, said latching element projecting through a lower recess of the covering and being in mechanical interaction with the inclination adjustment hook, wherein the latching element has a latching structure into which the inclination adjustment hook latches in various positions. The inclination adjustment hook can therefore hold the holding element in various inclined positions.

The headrest according to the invention comprises a previously mentioned headrest element. Diverse resting and supporting positions for a head of a vehicle occupant can be realized by means of the headrest, and therefore a particularly high degree of comfort with a simultaneously high degree of safety can be realized.

Exemplary embodiments of the invention will be explained in more detail with reference to drawings.

BRIEF DESCRIPTION OF THE DRAWINGS

In the drawings.

Mutually corresponding parts are provided with the same reference signs in all of the figures.

DETAILED DESCRIPTION

Figure 1:
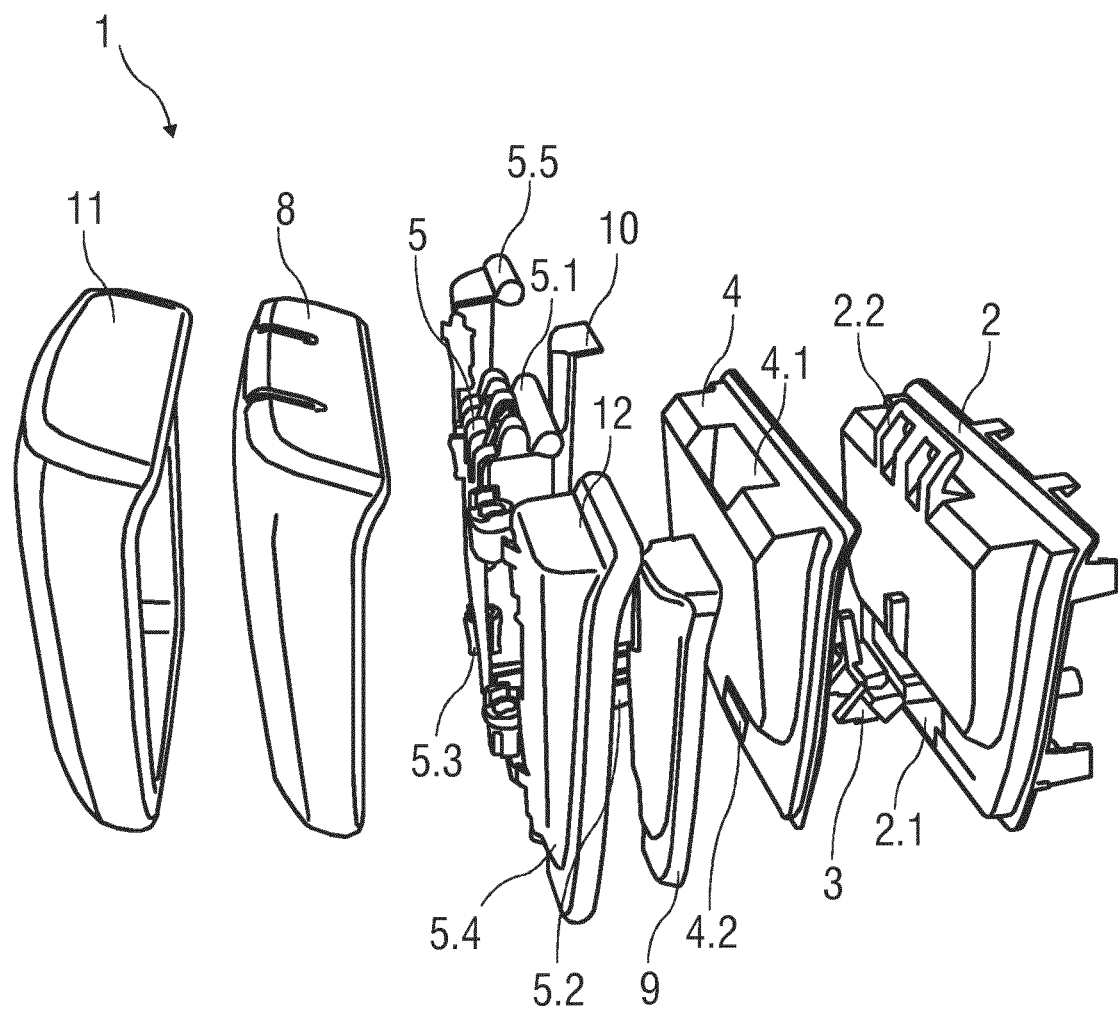
FIG. 1 schematically shows an exploded illustration of a headrest element for a headrest, and FIG. 2 schematically shows an enlarged detail of the exploded illustration according to FIG. 1.
Figure 2:
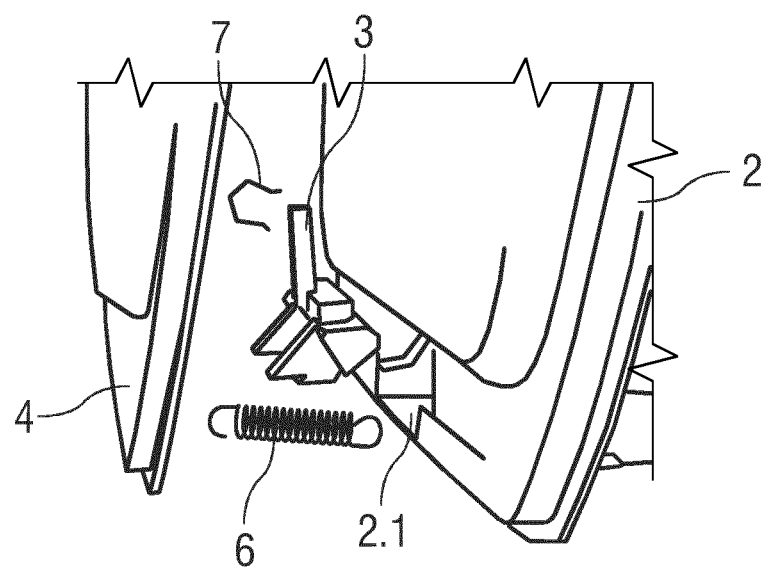

FIG. 1 schematically shows an exploded illustration of a possible exemplary embodiment of a headrest element 1 according to the invention for a headrest for a vehicle. FIG. 2 shows an enlarged detail of the exploded illustration according to FIG. 1.

The headrest element 1 comprises a basic body 2, the position of which can be adjusted, for example, in the longitudinal, transverse and/or vertical direction of a vehicle, i.e. in the X, Y and Z direction of a vehicle coordinate system.

The basic body 2 has a fastening recess 2.1 which is designed for receiving and for fastening an inclination adjustment hook 3.

A unit formed from the basic body 2 and the inclination adjustment hook 3 is covered with a covering 4.

Furthermore, the headrest element 1 comprises a holding element 5 with a bearing element 5.1 which projects through an upper recess 4.1 of the covering 4 and engages in a corresponding bearing element 2.2 of the basic body 2. The two bearing elements 2.2, 5.1 here form a pivot bearing, by means of which the holding element 5 is pivotable about a transverse pivot axis, which runs substantially in the transverse direction of a vehicle seat, in order to adjust an inclination of the holding element 5.

A latching element 5.2 is arranged at a lower end of the holding element 5, said latching element projecting through a lower recess 4.2 of the covering 4 and being in mechanical interaction with the inclination adjustment hook 3. The latching element 5.2 here has a latching structure, not illustrated specifically, into which the inclination adjustment hook 3 can latch in various positions and thus holds the holding element 5 in various inclined positions. Two spring elements 6, 7 are arranged on the inclination adjustment hook 3, said spring elements, for example, pressing the inclination adjustment hook 3 into the latching structure and/or holding said inclination adjustment hook in a predetermined position.

The holding element 5 has a central fastening region 5.3 for the fastening of a central supporting cushion 8, and two lateral fastening regions 5.4, 5.5 for the fastening in each case of a lateral supporting cushion 9, 10. The central supporting cushion 8 and the lateral supporting cushions 9, 10 are each provided with a cover 11, 12.

The lateral fastening regions 5.4, 5.5 are mounted here on the central fastening region 5.3 in such a manner that the lateral supporting cushions 9, 10, which form lateral supporting regions or what are referred to as headrest wings, can be pivoted about a side pivot axis running at least substantially parallel to a supporting surface of the central supporting cushion 8 which forms a central supporting region. By this means, an angle of the supporting surfaces of the lateral supporting cushions 9, 10 can be adjusted variably with respect to the supporting surface of the central supporting cushion 8. In addition, the central supporting cushion 8 and the lateral supporting cushions 9, 10 can be jointly pivoted about the transverse pivot axis in such a manner that an adjustment of the inclination of the supporting cushions 8 to 10 about the transverse pivot axis is possible.

LIST OF REFERENCE SIGNS

1 Headrest element
2 Basic body
2.1 Fastening recess
2.2 Bearing element
3 Inclination adjustment hook
4 Covering
4.1 Upper recess
4.2 Lower recess
5 Holding element
5.1 Bearing element
5.2 Latching element
5.3 Central fastening region
5.4 Lateral fastening region
5.5 Lateral fastening region
6 Spring element
7 Spring element
8 Central supporting cushion
9 Lateral supporting cushion
10 Lateral supporting cushion
11 Cover
12 Cover

The invention claimed is:

1. A headrest element, comprising a central supporting region and two lateral supporting regions, wherein
   the lateral supporting regions are pivotable with respect to the central supporting region, each about a separate side pivot axis, which side pivot axes runs at least substantially parallel to a supporting surface of the central supporting region, in such a manner that an angle of supporting surfaces of the lateral supporting regions can in each case be adjusted variably with respect to the supporting surface of the central supporting region, and
   the central supporting region and the lateral supporting regions are jointly pivotable about a transverse pivot axis, which transverse pivot axis runs at least substantially perpendicular to the two side pivot axes, in such a manner that an adjustment of the supporting regions in the longitudinal direction of the vehicle is possible;
   wherein the lateral fastening regions are each mounted at a central fastening region so as to be pivotable about the two side pivot axes;
   a basic body is provided, the position of which is adjustable in the longitudinal, transverse and/or vertical direction;
   the basic body has a fastening recess which is designed for receiving and for fastening an inclination adjustment hook;
   the basic body and the inclination adjustment hook form a unit which is covered with a covering;
   a holding element comprising a bearing element which projects through an upper recess of the covering and engages in a corresponding bearing element of the basic body, and
   the two bearing elements form a pivot bearing by the holding element being pivotable about the transverse pivot axis.

2. The headrest element as claimed in claim 1, wherein the holding element has the central fastening region for the fastening of a central supporting cushion forming the central supporting region, and two lateral fastening regions for the fastening in each case of a lateral supporting cushion forming the two lateral supporting regions.

3. The headrest element as claimed in claim 1, wherein a basic body is provided, the position of which is adjustable in the longitudinal, transverse and/or vertical direction.

4. The headrest element as claimed in claim 3, wherein the basic body has a fastening recess which is designed for receiving and for fastening an inclination adjustment hook.

5. The headrest element as claimed in claim 4, wherein the basic body and the inclination adjustment hook form a unit which is covered with a covering.

6. The headrest element as claimed in claim 5, wherein
- a latching element is arranged at a lower end of the holding element, said latching element projecting through a lower recess of the covering and being in mechanical interaction with the inclination adjustment hook, and
- the latching element has a latching structure into which the inclination adjustment hook latches in various positions.

7. The headrest element as claimed in claim 1, wherein
- a latching element is arranged at a lower end of the holding element, said latching element projecting through a lower recess of the covering and being in mechanical interaction with the inclination adjustment hook, and
- the latching element has a latching structure into which the inclination adjustment hook latches in various positions.

8. A headrest comprising a headrest element as claimed in claim 1.

* * * * *